US007430011B2

United States Patent
Xu et al.

(10) Patent No.: US 7,430,011 B2
(45) Date of Patent: Sep. 30, 2008

(54) IMAGE SENSOR HAVING DUAL AUTOMATIC EXPOSURE CONTROL

(75) Inventors: Xiangchen Xu, Sunnyvale, CA (US); Xiaodong Luo, Sunnyvale, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 869 days.

(21) Appl. No.: 10/350,141

(22) Filed: Jan. 22, 2003

(65) Prior Publication Data

US 2004/0141075 A1  Jul. 22, 2004

(51) Int. Cl.
*H04N 5/235* (2006.01)
*H04N 5/225* (2006.01)

(52) U.S. Cl. .................................... 348/362; 348/218.1

(58) Field of Classification Search ................. 348/362, 348/364, 216.1, 218.1, 267
See application file for complete search history.

(56) References Cited

U.S. PATENT DOCUMENTS

| 5,416,611 | A | | 5/1995 | Tandon |
| 5,714,753 | A | * | 2/1998 | Park ........................ 250/208.1 |
| 5,734,426 | A | * | 3/1998 | Dong ......................... 348/297 |
| 5,831,676 | A | * | 11/1998 | Takahashi et al. ........... 348/362 |
| 6,211,915 | B1 | * | 4/2001 | Harada ...................... 348/298 |
| 6,765,611 | B1 | * | 7/2004 | Gallagher et al. ......... 348/222.1 |
| 6,782,063 | B1 | * | 8/2004 | Stevenson et al. ........... 375/345 |
| 6,809,768 | B1 | * | 10/2004 | Merrill ...................... 348/308 |
| 6,831,692 | B1 | * | 12/2004 | Oda ............................ 348/315 |
| 6,859,230 | B2 | * | 2/2005 | Luo et al. ................... 348/297 |
| 6,924,841 | B2 | * | 8/2005 | Jones ......................... 348/294 |
| 6,970,195 | B1 | * | 11/2005 | Bidermann et al. ......... 348/308 |
| 6,972,794 | B1 | * | 12/2005 | Wang et al. ................. 348/302 |
| 2002/0027189 | A1 | * | 3/2002 | Murakami et al. ........ 250/208.1 |
| 2004/0096124 | A1 | * | 5/2004 | Nakamura .................. 382/308 |
| 2005/0195314 | A1 | * | 9/2005 | Fossum et al. .............. 348/362 |

FOREIGN PATENT DOCUMENTS

| JP | 60 136480 A | | 7/1985 |
| JP | 2000069491 A | * | 3/2000 |
| JP | 2000316163 A | * | 11/2000 |
| JP | 2001238126 A | * | 8/2001 |

OTHER PUBLICATIONS

High dynamic range imaging: spatially varying pixel exposures☐☐Nayar, S.K.; Mitsunaga, T.;☐☐Computer Vision and Pattern Recognition, 2000. Proceedings. IEEE Conference on☐☐vol. 1, Jun. 13-15, 2000 pp. 472-479 vol. 1.*
Nayar, S.K. et al., "High Dynamic Range Imaging : Spatially Varying Pixels Exposures". Proceedings 2000 IEEE Conference on Computer Vision and Pattern Recognition. CVPR 2000, Hilton Head Island, SC Jun. 13-15, 2000, Proceedings of the IEEE Computer Conference on Computer Vision and Pattern Recognition, Los Alamitos, CA IEEE Comp. So. vol. 1 of 2, (Jun. 13, 2000), pp. 472-479, XP002236923. ISBN 0-7803-6527-5.

* cited by examiner

*Primary Examiner*—Lin Ye
*Assistant Examiner*—Timothy J Henn
(74) *Attorney, Agent, or Firm*—Blakely Sokoloff Taylor & Zafman LLP

(57) ABSTRACT

An image sensor formed on an integrated circuit is disclosed. The image sensor comprises an array of pixels including a plurality of bright pixels and a plurality of dark pixels. The image sensor also includes a dark exposure control circuit for controlling the exposure time of the plurality of dark pixels and a bright exposure control circuit for controlling the exposure time of the plurality of bright pixels.

24 Claims, 3 Drawing Sheets

IMAGE SENSOR HAVING DUAL AUTOMATIC EXPOSURE CONTROL

TECHNICAL FIELD

The present invention relates generally to CMOS image sensors, and more particularly, to an image sensor having two independent sets of exposure time control.

BACKGROUND

Integrated circuit technology has revolutionized various fields including computers, control systems, telecommunications, and imaging. For example, in the imaging field, CMOS image sensors have proved to be less expensive to manufacture relative to CCD imaging devices. Further, for certain applications CMOS devices are superior in performance. The pixel elements in a MOS device can be made smaller and therefore provide a higher resolution than CCD image sensors. In addition, the signal processing logic necessary can be integrated alongside the imaging circuitry, thus allowing for a single integrated chip to form a complete stand alone imaging device. CMOS image sensors are now available from a variety of manufacturers, including the assignee of the present invention, OmniVision Technologies, Inc.

The primary building block of an image formed by a CMOS image sensor is a pixel. The number, size and spacing of the pixels determine the resolution of the image generated by the imaging device. The pixels of a CMOS image sensor are semiconductor devices that transform incident light photons into current signals. The signal produced by each pixel is generally extremely small.

One important parameter that the CMOS image sensor must be able to control is the exposure time of each pixel to incident light. Similar to light exposure time for photographic film, the exposure time of each pixel must be adjusted to compensate for variations in lighting conditions, such as for indoor or outdoor lighting. An exposure time that is too long will result in an image that is overly bright and washed out. In contrast, an exposure time that is too short will result in an image that is dark and difficult to view.

Typically, the exposure time is controlled by a circuit that implements an automatic exposure control (AEC) algorithm. U.S. Pat. No. 5,734,426 describes one prior art method of controlling exposure time. While adequate for many applications, there are imaging applications where an image may have both dark and light portions. In such cases, an AEC circuit can be easily confused with the combination of light and dark portions, thereby rendering imaging difficult.

BRIEF DESCRIPTION OF THE DRAWINGS

In the drawings, like reference numerals refer to like parts throughout the various views of the non-limiting and non-exhaustive embodiments of the present invention, and wherein.

DETAILED DESCRIPTION

In the following description, numerous specific details are provided, such as the identification of various system components, to provide a thorough understanding of embodiments of the invention. One skilled in the art will recognize, however, that the invention can be practiced without one or more of the specific details, or with other methods, components, materials, etc. In still other instances, well-known structures, materials, or operations are not shown or described in detail to avoid obscuring aspects of various embodiments of the invention.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
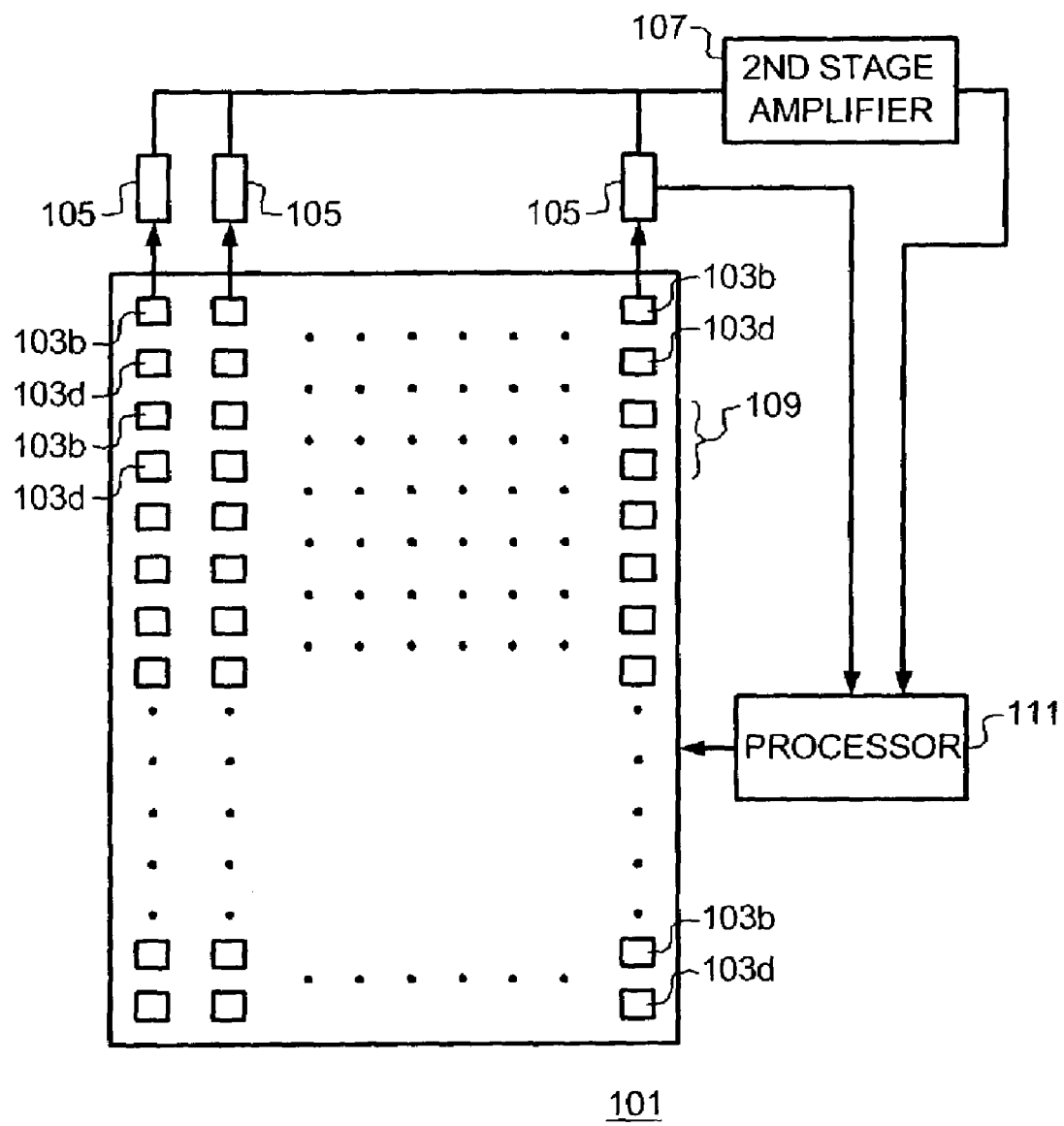
FIG. 1 is a schematic diagram of a CMOS image sensor having bright pixels and dark pixels.

With reference to FIG. 1, a CMOS image sensor 101 includes a rectangular matrix of pixels 103. The number of pixels in the horizontal or x-direction, and the number of pixels in the vertical or y-direction, constitutes the resolution of the image sensor 101. Each of the pixels 103 in a vertical column routes its signal to a charge amplifier 105.

Further, the pixels 103 can be grouped into two categories: "bright" pixels 103b and "dark" pixels 103d. As will be seen below, the bright pixels 103b will have their exposure time separately determined and controlled from the dark pixels 103d. It should be noted that in one embodiment, there is no structural difference between the bright pixels 103b and the dark pixels 103d. The categorization is generally made for AEC reasons. However, it may be that in other embodiments, there may be structural differences between bright pixels 103b and dark pixels 103d.

In general each bright pixel 103b has associated therewith a dark pixel 103d. This can be easily accomplished by pairing rows of pixels 103 together into a row pair 109 and designating the upper row as the bright pixel 103b and the lower row as the dark pixel 103d. It can be appreciated that the reverse designation is also acceptable. In such a manner, each bright pixel 103b in an upper row is associated with a dark pixel 103d in the lower row of a row pair 109.

While this is one example of an association between the bright and dark pixels, other associations may also be possible, such as by forming a column pair and designating one column as a bright pixel column and a second column as a dark pixel column. Numerous other logical grouping techniques may be utilized. Further, although in one embodiment, any one bright pixel 103b and its associated dark pixel 103d are in close physical proximity, this is not a requirement of the present invention.

The retrieval of information from the pixels 103 follows the well-known raster scanning technique. In particular, a row of pixels 103 is scanned sequentially from left to right. The next row is then scanned in this manner until all rows have been scanned sequentially from top to bottom. At the end of each complete scan of the entire array 101, a vertical blanking period of predetermined time occurs until the raster scanning pattern is repeated. This type of scanning follows the NTSC scanning scheme. However, for other applications, different readout protocols may be followed. Control circuitry of conventional design is operative to sequentially read the pixels 103 in this manner.

As each pixel is scanned, the signal from that pixel is provided to the charge amplifier 105 for that column. Thus, the charge amplifiers 105 receive signals sequentially. The sequential signals from the charge amplifiers 105 are then forwarded to a second-stage amplifier 107, which amplifies the signals so that they may be further processed. In various embodiments, either the column amplifier or the second-stage amplifier may be eliminated. The gain of the column amplifier or the second-stage amplifier may be selectively increased or decreased as the need arises. The readout of the pixels 103, the amplifiers 105 and 107, and the calculations and processes described below may be carried out by processor 111.

As noted above, one important function of the image sensor is to be able to automatically control the gain and exposure time of the image sensor to compensate for varying light conditions. Previous attempts to compensate for varying light conditions involve the simple monitoring of the average signal output from the pixels.

In accordance with the present invention, the bright pixels 103*b* have their exposure times adjusted using a different method than the dark pixels 103*d*. Most image sensors are what are referred to as "line-by-line" exposure devices. In these types of image sensors, each row of the image sensor begins the exposure cycle (also referred to as an integration cycle) at a different instant in time. As an example, referring to FIG. 1, the first row of the image sensor 101 would begin exposure to incident light (typically after a reset operation). A short period later, the second row of the image sensor 101 would begin exposure to incident light, also after a reset operation. The process continues until all of the rows have been exposed to incident light. It should be noted that the exposure time of the first row would continue for a length of time, and would typically not finish until many subsequent rows have started the exposure operation.

Indeed, the exposure time for a row is often measured as a number of rows that start the exposure operation. For example, the exposure time for a row may be measured as 16 rows or 20 rows. In other words, the total exposure time for any row is the time it takes to initiate exposure of 16 or 20 subsequent rows.

In one specific numerical example, assume that the imaging array has 640 columns and 480 rows (VGA format). At 30 frames per second, one frame must be captured about every 0.033 seconds. Still further, each row of the imaging array 101 must start the exposure operation about every 68 microseconds (0.033 seconds/480 rows). However, 68 microseconds is rarely enough exposure time to capture enough incident light. Indeed, it may take on the order of a millisecond exposure time in order to generate a usable output signal. Thus, from the time of initiation of exposure to the completion of exposure, 16 or more rows of the imaging array 101 have started the exposure process.

As noted above, the measure of the amount of exposure time is done not so much with a timer, but rather a counter that counts the number of rows that have started the exposure process. The term "exposure row count" is used herein to delineate the exposure time, measured by the number of rows. As such, if the exposure time is to be modified, the exposure row count must be modified.

If the exposure row count is nominally set at 16 rows for a typical light intensity, and if the image sensor 101 is then moved to a relatively brighter environment, the exposure row count should be decreased to decrease the exposure time. However, the decrease in exposure row count can only be done in "whole rows", e.g., the exposure row count cannot go from 16 rows to 15.34 rows, only to 15 rows.

Further, the methods and algorithms used to determine whether or not the exposure time or gain should be adjusted are many and varied. For example, U.S. Pat. No. 5,734,426 to Dong and assigned to the assignee of the present invention shows one method of determining adjustments to exposure or gain. As another example, our co-pending U.S. patent application Ser. No. 10/005,776 filed Nov. 7, 2001 entitled "METHOD OF FAST AUTOMATIC EXPOSURE OR GAIN CONTROL IN A MOS IMAGE SENSOR", incorporated herein by reference and assigned to the same assignee as the present invention, discloses another technique. In any event, various methods are possible for determining when to adjust exposure time or gain. In general, these methods attempt to maintain the average magnitude of the output signals from the pixels within a relatively narrow range, e.g. between $V_{HI}$ and $V_{LO}$. The narrow range is also referred to as a "stable range", where no further adjustments to exposure time or gain is required.

Figure 2:
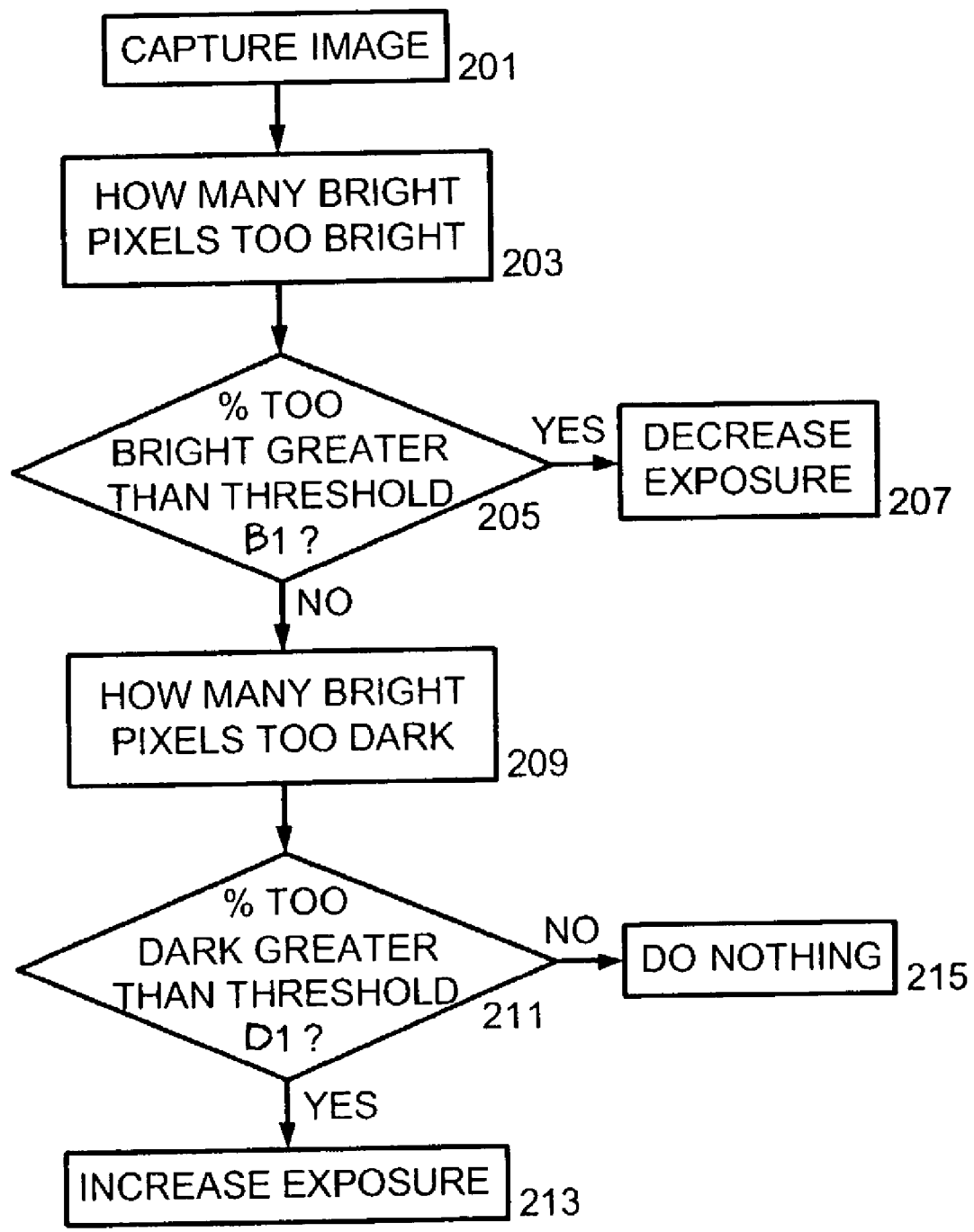
FIGS. 2-3 are flow diagrams illustrating the method of the present invention.

Turning next to FIG. 2, the AEC method with regard to the bright pixels 103*b* is illustrated. First, at box 201, the image is captured by the image sensor 101. The term image as used herein refers to at least one frame of a sequence of images. Next, at box 203, the processor 111 analyzes the signals output by each of the bright pixels 103*b*.

A count is made as to how many of the bright pixels 103*b* are considered to be "too bright." This is accomplished by comparing the signal level of each individual bright pixel 103*b* with a predetermined threshold. As will be seen in further detail below, several threshold values will be used in the method of the present invention. To avoid confusion, the predetermined threshold used in box 203 will be referred to as the BPTB threshold. This acronym stands for "Bright Pixel Too Bright" threshold. The BPTB threshold is, in one embodiment, set to be near the saturation level of a pixel. By determining how many of the bright pixels 103*b* exceed the BPTB threshold, a percentage measure can be obtained. This percentage is the ratio of the bright pixels 103*b* that exceed the BPTB threshold relative to the total number of bright pixels 103*b*.

As seen in box 205, if the percentage of the bright pixels that exceed the threshold is higher than a percentage threshold B1, then at box 207, the exposure time for the bright pixels 103*b* is decreased. The amount of the decrease of the exposure time can be varied depending upon the desired response time of the image sensor 101. Thus, the exact amount of adjustment of the exposure time of the bright pixels 103*b* is not crucial to the present invention. For example, the decrease in exposure time may be one exposure row count or many exposure row counts.

However, if the percentage of bright pixels 103*b* that exceed the BPTB threshold is not greater than the percentage threshold B1, then a next determination is made as to how many of the bright pixels 103B are considered "too dark." This determination is made at box 209. The determination of how many of the bright pixels 103*b* that are "too dark" is made by comparing the signal output by each pixel to a threshold value. Similar to the discussion above, the threshold value will be referred to as the BPTD threshold (corresponding to "bright pixel too dark").

Typically, in one embodiment, the BPTD threshold is set relatively close to a zero signal level. Next, at box 211, if the number of bright pixels 103*b* that are lower than the BPTD threshold as a percentage of the total number of bright pixels 103*b* exceeds a predetermined percentage threshold D1, then at box 213, the exposure time of the bright pixels 103*b* is increased. The amount of the increase of the exposure time can be varied depending upon the desired response time of the image sensor 101. Thus, the exact amount of adjustment of the exposure time of the bright pixels 103*b* is not crucial to the present invention. For example, the increase in exposure time may be one exposure row count or many exposure row counts.

If at decision box 211, the percentage of bright pixels 103*b* that are "too dark" does not exceed the threshold percentage D1, then at box 215, the exposure time for the bright pixels 103b is not substantially varied.

Figure 3:
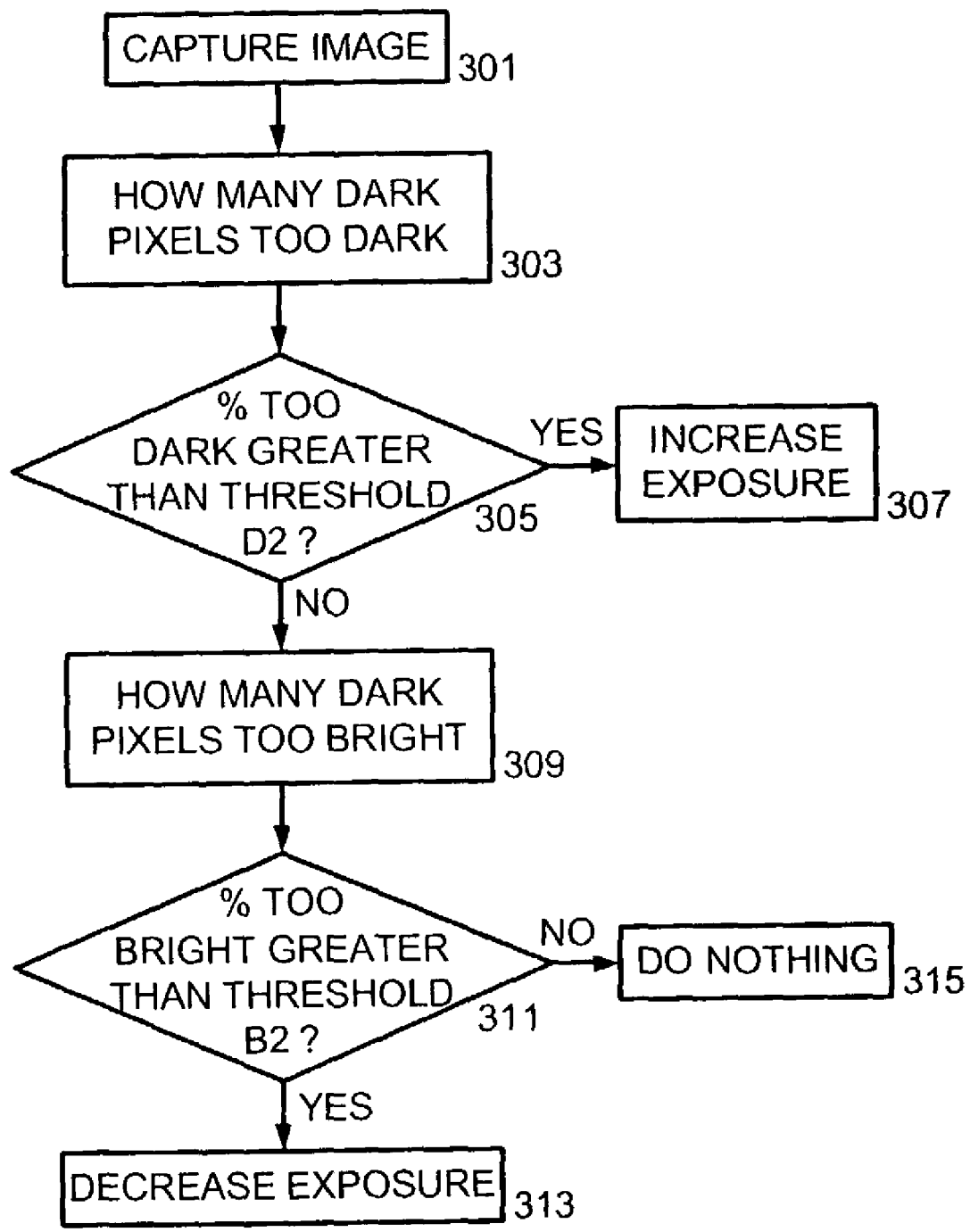

FIG. 3 shows a similar methodology with respect to the dark pixels 103d. First, at box 301, the image is captured by the image sensor 101. The term image as used herein refers to at least one frame of a sequence of images. Next, at box 303, the processor 111 analyzes the signals output by each of the dark pixels 103d.

A count is made as to how many of the dark pixels 103d are considered to be "too dark." This is accomplished by comparing the signal level of each individual dark pixel 103d with a predetermined threshold. To avoid confusion, the predetermined threshold used in box 303 will be referred to as the DPTD threshold. This acronym stands for "Dark Pixel Too Dark" threshold. The DPTD threshold is, in one embodiment, set to be near the zero signal level of a pixel. By determining how many of the dark pixels 103d are below the DPTD threshold, a percentage measure can be obtained. This percentage is the ratio of the dark pixels 103d that exceed the DPTD threshold relative to the total number of dark pixels 103d.

As seen in box 305, if the percentage of the dark pixels that are below the DPTD threshold is higher than a percentage threshold D2, then at box 307, the exposure time for the dark pixels 103d is increased. The amount of the increase of the exposure time can be varied depending upon the desired response time of the image sensor 101. Thus, the exact amount of adjustment of the exposure time of the dark pixels 103d is not crucial to the present invention. For example, the increase in exposure time may be one exposure row count or many exposure row counts.

However, if the percentage of dark pixels 103d that are below the DPTD threshold is not greater than the percentage threshold D2, then a next determination is made as to how many of the dark pixels 103d are considered "too bright." This determination is made at box 309. The determination of how many of the dark pixels 103d that are "too bright" is made by comparing the signal output by each dark pixel 103d to a threshold value. Similar to the discussion above, the threshold value will be referred to as the DPTB threshold (corresponding to "dark pixel too bright").

Typically, in one embodiment, the DPTB threshold is set relatively close to a saturation signal level. Next, at box 311, if the number of dark pixels 103d that are higher than the DPTB threshold as a percentage of the total number of dark pixels 103d exceeds a predetermined percentage threshold B2, then at box 313, the exposure time of the dark pixels 103d is decreased. The amount of the increase of the exposure time can be varied depending upon the desired response time of the image sensor 101. Thus, the exact amount of adjustment of the exposure time of the dark pixels 103d is not crucial to the present invention. For example, the increase in exposure time may be one exposure row count or many exposure row counts.

If at decision box 311, the percentage of dark pixels 103d that are "too bright" does not exceed the threshold percentage B2, then at box 315, the exposure time for the dark pixels 103d is not substantially changed.

As with most AEC methods, the effect of the AEC control circuit and processing is only apparent on subsequent frames captured by the image sensor 101. This is because changes to the exposure time of the pixels 103 of the image sensor 101 would only affect subsequent frames.

Another aspect of the present invention is the formation of the image based upon the signals output by the pixels 103. As noted above, the pixels 103 are divided into bright pixels 103b and dark pixels 103d. Each individual bright pixel 103b has associated therewith a single dark pixel 103d. These two pixels together form a single imaging element for image reconstruction purposes.

Thus, the effective resolution of an image sensor 101 would be reduced by up to half. Alternatively speaking, for a given resolution, up to twice as many individual pixels 103 may be required. Nevertheless, for many low-resolution applications, this is not of large concern to include additional pixels where a large dynamic range in light sensitivity is required. Further, human eyes are not as sensitive to vertical resolution.

Further, in general, to achieve a high dynamic range, in one embodiment, the percentage D2 is less than the percentage D1 and the percentage B1 is less than the percentage B2. However, it can be appreciated that for various applications, the relationship of the various threshold percentages may be varied. However, under the parameters set forth above, this allows the bright pixels 103b to perceive bright objects as well as having the dark pixels 103d perceive dark objects.

Moreover, the AEC methodology of the present invention may also be used in conjunction with automatic gain control (AGC). Similarly, there would be two separate automatic gain control circuits or algorithms used for the bright pixels 103b and the dark pixels 103d. Typically, if the AEC circuit is unable to provide a large enough dynamic range, the AGC can augment the dynamic range.

The combination of the bright pixel 103b and its associated dark pixel 103d to form a single pixel element is done, in one embodiment, by adding the signals from the bright pixel and the dark pixel. The combination of the bright pixel and the dark pixel may be referred to as a composite pixel element. The combination of the bright pixel and the dark pixel signal can take many and varied forms. For example, it can be a simple addition of the signals with each pixel contributing equally to the final signal output for that pixel element. Alternatively, various ratios of the dark pixel signal to the bright pixel signal can be used to come up with the final signal for the pixel element.

From the foregoing, the dynamic range and sensitivity to light of the image sensor 101 is not fixed. When the luminance of an image is even, the AEC algorithms for both the bright pixels 103b and the dark pixels 103d will provide similar exposure times. This means that the captured image will not lose contrast. However, if the difference between the bright part of an image and the dark parts of an image are great, the AEC algorithm for the dark pixels will provide an exposure time much longer than that for the bright pixels provided by the AEC for the bright pixels. In this way, the dynamic range for the image sensor 101 can be made very large. Further, it can be appreciated that the actual calculations and determinations may take place within and controlled by processor 111.

While the invention is described and illustrated here in the context of a limited number of embodiments, the invention may be embodied in many forms without departing from the spirit of the essential characteristics of the invention. The illustrated and described embodiments are therefore to be considered in all respects as illustrative and not restrictive. Thus, the scope of the invention is indicated by the appended claims rather than by the foregoing description, and all changes which come within the meaning and range of equivalency of the claims are intended to be embraced therein.

What is claimed is:

1. An image sensor formed on an integrated circuit comprising:
   an array of pixels, said array of pixels including a plurality of bright pixels and a plurality of dark pixels;

a dark exposure control circuit for controlling the exposure time of said plurality of dark pixels, said dark exposure control circuit increasing the exposure time of said dark pixels if a number of said dark pixels that are darker than a dark pixel too dark (DPTD) threshold exceeds a predetermined threshold D2; and a bright exposure control circuit for controlling the exposure time of said plurality of bright pixels, said bright exposure control circuit decreasing the exposure time of said bright pixels if a number of said bright pixels that are brighter than a bright pixel too bright (BPTB) threshold exceeds a predetermined threshold B1, wherein said bright exposure control circuit is further capable of increasing the exposure time of said bright pixels if the number of said bright pixels that are darker than a bright pixel too dark (BPTD) threshold exceeds a predetermined threshold D1, wherein said dark exposure control circuit and said bright exposure control circuit are independent from each other, wherein the predetermined threshold D2 is less than the predetermined threshold D1.

2. The image sensor of claim 1 wherein said away of pixels form a two-dimensional array.

3. The image sensor of claim 1 wherein said each of said plurality of bright pixels has an associated dark pixel.

4. The image sensor of claim 3 wherein said associated dark pixel is adjacent to a bright pixel.

5. The image sensor of claim 4 wherein the signal from said associated dark pixel and said adjacent bright pixel is combined to form a composite pixel element signal.

6. The image sensor of claim 1 wherein said predetermined threshold D2 is a percentage threshold of the total number of dark pixels.

7. The image sensor of claim 1 wherein said dark exposure control circuit further decreasing the exposure time of said dark pixels if a number of said dark pixels that are brighter than a dark pixel too bright (DPTB) threshold exceeds a predetermined threshold B2.

8. The image sensor of claim 7 wherein said predetermined threshold B2 is a percentage threshold of the total number of dark pixels.

9. The image sensor of claim 7 wherein said bright exposure control circuit decreasing the exposure time of said bright pixels if a number of said bright pixels that are brighter than a bright pixel too bright (BPTB) threshold exceeds a predetermined threshold B1.

10. The image sensor of claim 9 wherein said predetermined threshold B1 is a percentage threshold of the total number of bright pixels.

11. The image sensor of claim 7 wherein said predetermined threshold D1 is a percentage threshold of the total number of bright pixels.

12. The image sensor of claim 7, wherein the predetermined threshold B1 is less than the predetermined threshold B2.

13. The image sensor of claim 1 wherein said predetermined threshold B1 is a percentage threshold of the total number of bright pixels.

14. The image sensor of claim 1 wherein said predetermined threshold D1 is a percentage threshold of the total number of bright pixels.

15. The image sensor of claim 1, wherein the bright pixels and the dark pixels are substantially structurally similar.

16. The image sensor of claim 1, further comprising:
a first gain control circuit coupled to control a first gain of said bright pixels; and
a second gain control circuit, independent of the first gain control circuit, coupled to control a second gain of said dark pixels.

17. A method for controlling an image sensor, the image sensor having an array of pixels, said away of pixels including a plurality of bright pixels and a plurality of dark pixels, the method comprising:
increasing an exposure time of said dark pixels, if a number of said dark pixels that are darker than a dark pixel too dark (DPTD) threshold exceeds a predetermined threshold D2;
decreasing the exposure time of said dark pixels, if a number of said dark pixels that are brighter than a dark pixel too bright (DPTB) threshold exceeds a predetermined threshold B2; and
decreasing an exposure time of said bright pixels, if a number of said bright pixels that are brighter than a bright pixel too bright (BPTB) threshold exceeds a predetermined threshold B1, wherein the exposure time of said plurality of bright pixels is controlled independent of the exposure time of said plurality of dark pixels, wherein the predetermined threshold B1 is less than the predetermined threshold B2.

18. The method of claim 17 further including associating each of said plurality of bright pixels with an associated dark pixel from said plurality of dark pixels.

19. The method of claim 18 wherein the signals from said associated dark pixel and said adjacent bright pixel are combined to form a composite pixel element signal.

20. The method of claim 18 wherein said associated dark pixel is adjacent to a bright pixel.

21. The method of claim 17 wherein said predetermined threshold D2 is a percentage threshold of the total number of dark pixels.

22. The method of claim 17 wherein said predetermined threshold B1 is a percentage threshold of the total number of bright pixels.

23. The method of claim 17, further comprising increasing the exposure time of said bright pixels, if a number of said bright pixels that are darker than a bright pixel too dark (BPTD) threshold exceeds a predetermined threshold D1.

24. The method of claim 23, wherein the predetermined threshold D2 is less than the predetermined threshold D1.

\* \* \* \* \*